United States Patent [19]

Pryor et al.

[11] 4,196,262

[45] Apr. 1, 1980

[54] AL-SI-IN/GA ALLOY CLAD COMPOSITE

[75] Inventors: Michael J. Pryor, Woodbridge; James M. Popplewell, Guilford, both of Conn.; William H. Anthony, Manchester, Mo.

[73] Assignee: Swiss Aluminium Ltd., Chippis, Switzerland

[21] Appl. No.: 20,797

[22] Filed: Mar. 15, 1979

[51] Int. Cl.$^2$ .............................................. B32B 15/20
[52] U.S. Cl. ...................................... 428/654; 75/148
[58] Field of Search .................. 428/654; 75/147, 148

[56] References Cited

U.S. PATENT DOCUMENTS

| | | | |
|---|---|---|---|
| 1,997,165 | 4/1935 | Brown | 428/654 |
| 2,852,365 | 9/1958 | Schluchter | 75/148 |
| 3,240,688 | 3/1966 | Pryor et al. | 75/148 X |
| 3,791,820 | 2/1974 | Werner | 75/148 X |
| 3,881,879 | 5/1975 | Singleton et al. | 75/147 X |
| 3,898,053 | 8/1975 | Singleton | 428/654 |
| 4,093,782 | 6/1978 | Anthony et al. | 428/654 |

*Primary Examiner*—R. Dean
*Assistant Examiner*—W. G. Saba
*Attorney, Agent, or Firm*—Bachman and LaPointe

[57] ABSTRACT

An aluminum composite is provided having improved resistance to intergranular corrosion, especially a brazed aluminum composite. The composite comprises an aluminum base alloy core clad with a brazing alloy consisting essentially of from 4–14% silicon, from 0.01–2% of a material selected from the group consisting of indium, gallium and mixtures thereof, and the balance essentially aluminum. The additions to the brazing alloy reduce the tendency for the brazing alloy layer to induce intergranular corrosion of the core alloy layer. They also reduce the pitting rate of the brazing alloy layer.

10 Claims, No Drawings

AL-SI-IN/GA ALLOY CLAD COMPOSITE

BACKGROUND OF THE INVENTION

Brazed aluminum equipment is subject to the severe problem of intergranular corrosion on surfaces coated with the brazing alloy. This is caused by migration of silicon-rich material from the brazing alloy layer into the parent metal during the brazing process. The more noble potential of conventional brazing alloy claddings with respect to the core alloys galvanically accelerates intergranular corrosion. As a consequence, failures due to complete penetration or mechanical weakening can occur. It has been observed that brazed headers, fins and tubes in automotive radiators fabricated from, for example, vacuum brazing Alloy 4004 (an aluminum base alloy containing about 9.5% silicon, 1.5% magnesium, up to 0.3% iron, up to 0.05% copper, up to 0.07% manganese, up to 0.01% titanium, and the balance essentially aluminum) clad onto aluminum Alloy 3003 (an aluminum base alloy containing from 1.0 to 1.5% manganese, from 0.05 to 0.20% copper, up to 0.07% iron, up to 0.6% silicon, up to 0.1% zinc, balance essentially aluminum) designated by the Aluminum Association as No. 7 or 8 brazing sheet, are particularly susceptible to this form of damage. In addition, gas liquefaction equipment and heat exchangers generally also suffer from intergranular corrosion.

The corrosive environments which can cause this problem include water containing dissolved chloride, bicarbonate or sulfate irons, especially if the pH of the water has a relatively low value. Such waters may condense as films on the fins of heat exchanger equipment used for automotive or aircraft air conditioners, automotive radiators, gas liquefaction equipment or the like.

Intergranular corrosion has also been encountered in other applications, as on brazed headers inside automotive radiators and heat exchangers generally. In such cases, the coolant is usually corrosive. For example, if automotive antifreeze solutions are used, poor maintenance can often result in the solution becoming corrosive for a variety of reasons. Chief among these reasons is that the antifreeze may have been allowed to remain in the radiator for a number of years without replacement while replenishing the level with mixtures of fresh antifreeze solution or hard natural water. These practices would deplete the corrosion inhibitors and reserve alkalinity components, permitting the coolant pH to drop and allowing heavy metal ions to accumulate from reaction of the acids with copper alloy and cast iron surfaces in the coolant system.

U.S. Pat. Nos. 3,898,053 and 3,853,547 describe certain aluminum-silicon brazing compositions for joining aluminum alloy components; however, these compositions do not solve the problem of intergranular corrosion described hereinabove.

Accordingly, it is a principal object of the present invention to provide an improved brazed aluminum composite which is characterized by substantial resistance to intergranular corrosion.

It is a still further object of the present invention to provide a composite as aforesaid which is inexpensive and convenient to use on a commercial scale.

Further objects and advantages of the present invention will appear hereinbelow.

SUMMARY OF THE INVENTION

In accordance with the present invention it has been found that the foregoing objects and advantages may be readily obtained. The brazing aluminum composite of the present invention is characterized by improved resistance to intergranular corrosion. The composite of the present invention comprises an aluminum base alloy core clad with a brazing alloy consisting essentially of from 4-14% silicon, from 0.01-2% of a material selected from the group consisting of indium, gallium and mixtures thereof, and the balance essentially aluminum, wherein the cladding cathodically protects the core in corrosive environments.

In accordance with the present invention, the cladding may be metallurgically bonded to the core alloy before the brazing process, or it may be used as a filler metal at the time of brazing.

The core may be clad on one or both sides.

DETAILED DESCRIPTION

As indicated hereinabove, the brazed aluminum composite of the present invention is characterized by improved resistance to intergranular corrosion due to the diminished galvanic driving force for corrosion of the modified brazing alloy-unialloy couple and a lower pitting rate.

The core or parent material is not especially critical and any desirable aluminum base alloy may be readily employed. For example, typical cores which may be employed include aluminum Alloys 3003, 3105, 6951 and chromium-modified Alloy 3003. For example, the core may contain up to 2% manganese, up to 1% copper, up to 2% iron, up to 2% silicon, up to 1% zinc, up to 1% chromium, up to 2% magnesium, and up to 0.2% titanium as well as common impurities and others each up to 0.05% and total up to 0.15%.

The cladding composition is an aluminum base alloy consisting essentially of from 4-14% silicon and from 0.01-2% of a material selected from the group consisting of indium and gallium and mixtures thereof. In addition, the cladding may contain from 0.05-0.2% bismuth and from 0.5-3% magnesium. The cladding material may also contain up to 1% iron, up to 0.5% copper, up to 0.5% manganese, up to 0.2% titanium, others up to 0.05% each, total up to 0.15% as well as conventional impurities.

It has been observed that intergranular corrosion of brazing alloy coated surfaces is associated with penetration of silicon from the brazing alloy into the parent metal layer. Thus, for example, aluminum Alloy 3003 clad with an aluminum base alloy containing 10% silicon and 1% magnesium shows intergranular corrosion caused by a silicon enrichment which occurs preferentially along grain boundaries. Severe attack is found when the material is exposed to an intergranular corrosion test in both the brazing alloy and the parent metal at locations which contained particles of silicon or silicon-rich phase. It is believed that the intergranular corrosion process is caused by galvanic action between the more noble silicon-rich phase and the neighboring matrix aluminum.

In accordance with the present invention it has been found possible to reduce or eliminate such intergranular corrosion by utilizing the composite of the present invention as described hereinabove. The composite of the present invention surprisingly forms a galvanic couple whose driving force for corrosion of the core is diminished because the braze cladding is less noble than conventional brazing alloy claddings. The pitting rate of the braze cladding alloys is also lower.

The composite of the present invention is particularly useful in the manufacture of brazed equipment by mass production methods involving either flux or vacuum brazing. The composites of the present invention also have particular value for equipment which is expected to encounter corrosive conditions which could cause intergranular corrosion of the parent metal layers of conventional brazing sheets. Vacuum brazed aluminum heater cores have been found to have severe intergranular corrosion problems when made using conventional brazing sheets with Alloy 3003 parent metal. These heater cores are used, for example, to provide warm air to warm the passenger compartment of passenger cars by extracting excess heat from the automotive engine coolant. The engine coolant passes through channels formed by parallel plates of brazing sheet which are brazed to the inlet and outlet header tanks of the heater core units. The intergranular corrosion results from contact between the corrosive aqueous engine coolant and the internal surfaces of the plate channels. The composite of the present invention significantly reduces the intergranular corrosion which occurs in this type of application.

Other automotive applications exist in which the composite of the present invention may be advantageously employed, including automotive radiators and oil coolers in engine systems, and also evaporators and condensers in automotive air conditioning systems. Alternatively, the core could be used as a monolithic sheet in an assembly with the brazing alloy in the form of another sheet or foil associated with the core. The assembly can then be brazed together to form the final composite article.

The present invention and improvements resulting therefrom will be more readily apparent from a consideration of the following illustrative examples.

EXAMPLE I

In accordance with this example corrosion behavior test materials were compared by reference to a saturated calomel electrode (SCE). The core alloy samples tested were subjected to a simulated brazing treatment which consisted of holding the sample for 5 hours at 1000° F. followed by 1 hour at 1115° F. This braze simulation cycle sensitizes the core component to intergranular corrosion.

In accordance with this test the rest potential was determined as a function of time for the various samples in corrosive media A and B set out in Table I below as compared to a saturated calomel electrode. The results of the test measure in millivolts how galvanically active a specimen is as compared to the reference electrode and hence provides a measure of relative activity.

Table II defines the alloys tested which included two controls (Alloys 3003 and 4004) and two alloys of the present invention.

Tables III and IV show the results and clearly show that the alloys of the present invention, Alloys 2 and 3, are not as noble relative to Alloy 3003 as the conventional Alloy 4004 and therefore would not have as adverse an effect on corrosion and would afford a greater degree of cathodic protection.

TABLE I

COMPOSITIONS OF INTERGRANULAR CORROSION TEST MEDIA

| COMPOSITION A. | The following quanities of materials are dissolved in 10 liters of distilled water. |
|---|---|
| 1.48 grams $Na_2SO_4$ | |
| 1.65 grams NaCl | |
| 1.40 grams $NaHCO_3$ | |
| 0.29 grams $FeCl_3$ | |
| 0.39 grams $CuSO_4 \cdot 7H_2O$ | |
| COMPOSITION B. | The following material in the amount shown is dissolved in 25 liters of distilled water. |
| 145 grams NaCl | |

TABLE II

ALLOY COMPOSITIONS

COMPOSITION - WEIGHT %

| ALLOY NO. | Si | Fe | Cu | Mn | Mg | Zn | Ti | Other |
|---|---|---|---|---|---|---|---|---|
| 1 (4004) | 9.7 | 0.3 | 0.05 | 0.07 | 1.5 | — | 0.01 | — |
| 2 | 9.7 | 0.3 | 0.05 | 0.07 | 1.5 | — | 0.01 | 0.1 Indium |
| 3 | 9.7 | 0.3 | 0.05 | 0.07 | 1.5 | — | 0.01 | 0.1 Gallium |
| 4 (Commercial Alloy 3003) | 0.6 | 0.7 | 0.12 | 1.25 | — | 0.1 | — | — |

TABLE III

REST POTENTIAL AS A FUNCTION OF TIME OF ALLOYS IN TEST COMPOSITION A AT 28° C.

REST POTENTIAL VS. SCE[1], mV

DAYS

| ALLOY | 0 | 1 | 2 | 5 | 6 | 7 | 8 | 9 | 12 | 13 | 14 | 15 | 20 |
|---|---|---|---|---|---|---|---|---|---|---|---|---|---|
| 1 | 495 | 520 | 530 | 560 | 555 | 615 | 610 | 610 | 515 | 580 | 550 | 570 | 595 |
| 2 | 515 | 580 | 585 | 650 | 640 | 665 | 670 | 685 | 610 | 630 | 625 | 630 | 650 |
| 3 | 525 | 600 | 590 | 640 | 630 | 640 | 660 | 665 | 635 | 680 | 605 | 610 | 620 |
| 4 | 442 | 530 | 640 | 1060 | 1170 | 1050 | 1050 | 1050 | 1050 | 1050 | 1050 | 1050 | 1050 |

[1]All values are negative re SCE

TABLE IV

REST POTENTIAL AS A FUNCTION OF TIME OF ALLOYS IN TEST COMPOSITION AT 28° C.

REST POTENTIAL VS. SCE[1], mV

DAYS

| ALLOY | 0 | 1 | 2 | 3 | 6 | 7 | 8 | 9 | 10 | 13 | 14 | 15 | 16 | 17 | 21 |
|---|---|---|---|---|---|---|---|---|---|---|---|---|---|---|---|
| 1 | 650 | 720 | 670 | 700 | 690 | 695 | 680 | 690 | 685 | 720 | 780 | 730 | 690 | 690 | 710 |
| 2 | 700 | 730 | 760 | 770 | 780 | 780 | 780 | 800 | 800 | 795 | 805 | 795 | 770 | 795 | 815 |
| 3 | 760 | 760 | 755 | 770 | 770 | 775 | 780 | 780 | 720 | 795 | 785 | 785 | 780 | 795 | 810 |

TABLE IV-continued

REST POTENTIAL AS A FUNCTION OF TIME
OF ALLOYS IN TEST COMPOSITION AT 28° C.

| | REST POTENTIAL VS. SCE[1], mV | | | | | | | | | | | | | | |
|---|---|---|---|---|---|---|---|---|---|---|---|---|---|---|---|
| | DAYS | | | | | | | | | | | | | | |
| ALLOY | 0 | 1 | 2 | 3 | 6 | 7 | 8 | 9 | 10 | 13 | 14 | 15 | 16 | 17 | 21 |
| 4 | 620 | 660 | 755 | 780 | 991 | 645 | 690 | 715 | 820 | 800 | 795 | 710 | 700 | 735 | 845 |

[1]All values are negative re SCE

EXAMPLE II

The following example shows a pit depth analysis of the material of the present invention as compared to the Alloy 4004 (Alloy 1 - Table II) as a control. In accordance with this example, samples were exposed for periods of time in corrosive compositions A and B (Table I) and pitting results analyzed. The results are set forth in Tables V and VI below. Table V shows that in corrosive composition A the material of the present invention (Alloy 2) revealed pits to an equivalent maximum depth of 4 mils; whereas 4004 (Alloy 1) pitted to a maximum depth of 7 mils. On a mean depth basis pitting of 4004 was 4 mils, while Alloy 2 produced a mean pit value of 3. Table VI shows that in corrosive composition B this trend continues showing 4004 pitting to a maximum depth of 13 mils; whereas Alloy 3 of the present invention shows a value of 8 mils.

TABLE V

PIT DEPTH ANALYSIS - SAMPLES IN
CORROSIVE COMPOSITION A FOR TWO DAYS AT 28° C.

| | PIT DEPTH - MILS | |
|---|---|---|
| ALLOY | MEAN | DEEPEST |
| 1 | 4 | 7 |
| 2 | 3 | 4 |

TABLE VI

PIT DEPTH ANALYSIS - SAMPLES IN
CORROSIVE COMPOSITION B FOR 21 DAYS AT 28° C.

| | PIT DEPTH - MILS | |
|---|---|---|
| ALLOY | MEAN | DEEPEST |
| 1 | 6 | 13 |
| 2 | 8 | 11 |
| 3 | 6 | 8 |

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An aluminum composite having improved resistance to intergranular corrosion comprising an aluminum base alloy core clad with a brazing alloy consisting essentially of from 4–14% silicon, 0.01–2% of a material selected from the group consisting of indium, gallium and mixtures thereof, and the balance aluminum.

2. A brazed aluminum composite according to claim 1.

3. A composite according to claim 1 wherein said cladding contains indium.

4. A composite according to claim 1 wherein said cladding contains gallium.

5. A composite according to claim 1 wherein said core is clad on both sides with said cladding.

6. A composite according to claim 1 wherein said core contains up to 2% manganese, up to 1% copper, up to 2% iron, up to 2% silicon, up to 1% zinc, up to 1% chromium, up to 2% magnesium, up to 0.2% titanium, and others each up to 0.05%, total up to 0.15%.

7. A composite according to claim 1 wherein said core is aluminum Alloy 3003.

8. A composite according to claim 1 wherein said cladding contains from 0.05–0.2% bismuth.

9. A composite according to claim 1 wherein said cladding contains from 0.5–3% magnesium.

10. A composite according to claim 1 wherein said cladding contains up to 1% iron, up to 0.5% copper, up to 0.5% manganese, up to 0.2% titanium, others up to 0.05% each, total up to 0.15%.

* * * * *